Aug. 19, 1941.  A. H. R. FEDDEN ET AL  2,253,025

VIBRATION DAMPING MEANS

Filed May 11, 1939  2 Sheets-Sheet 1

Inventors
Alfred H. R. Fedden
and Frank Nixon
by Wilkinson & Mawhinney
Attorneys.

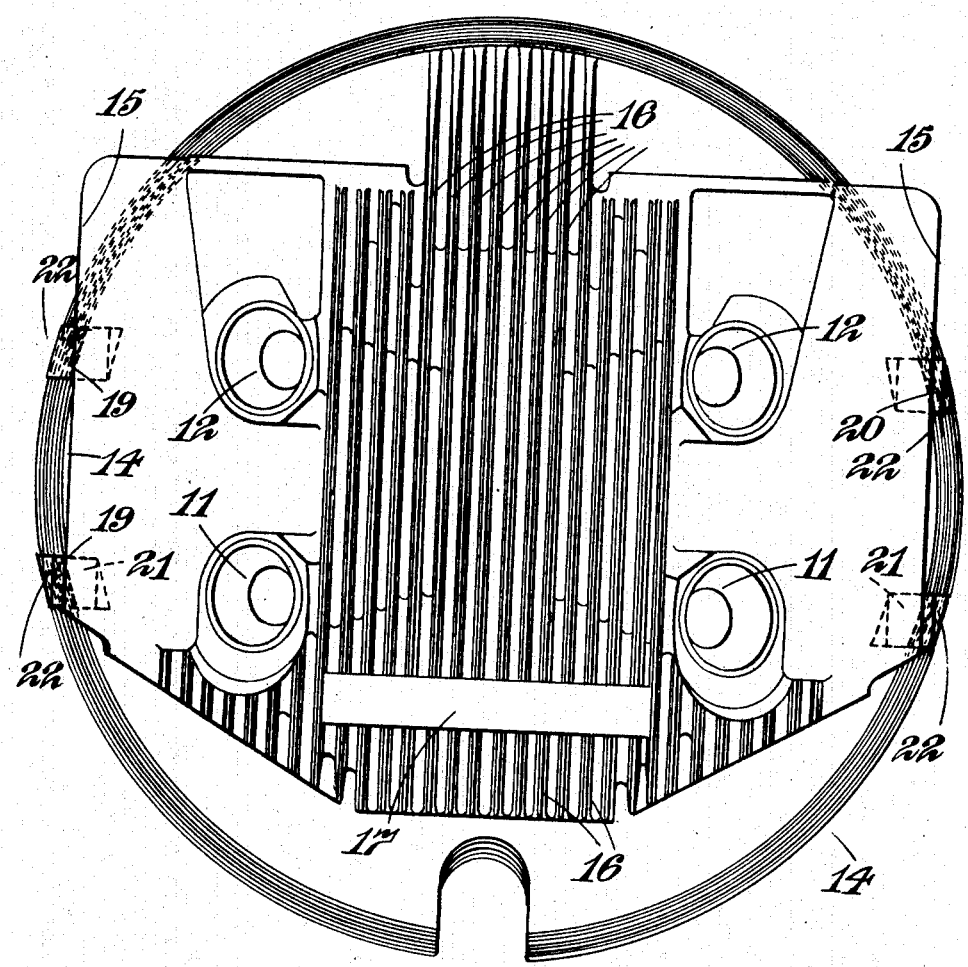

Patented Aug. 19, 1941

2,253,025

UNITED STATES PATENT OFFICE 2,253,025

VIBRATION DAMPING MEANS

Alfred Hubert Roy Fedden and Frank Nixon, Bristol, England, assignors to The Bristol Aeroplane Company Limited, Bristol, England, a British company Application May 11, 1939, Serial No. 273,112
In Great Britain July 7, 1938

7 Claims. (Cl. 257—261)

This invention is for improvements in vibration damping means for air-cooled internal-combustion engines. The cooling fins with which the cylinders of such engines are provided experience vibration when the engine is running and it has been found that such vibration may, in certain circumstances, subject the fins to fatigue stresses so great as to cause fracture.

According to the invention, an air-cooled internal-combustion engine, comprises the combination with a cooling fin of means for damping the said vibration. The said damping means preferably comprises a pad, block or sheet of resilient material engaging an outer part of the fin at one or more points along the fin-edge.

Figure 1:
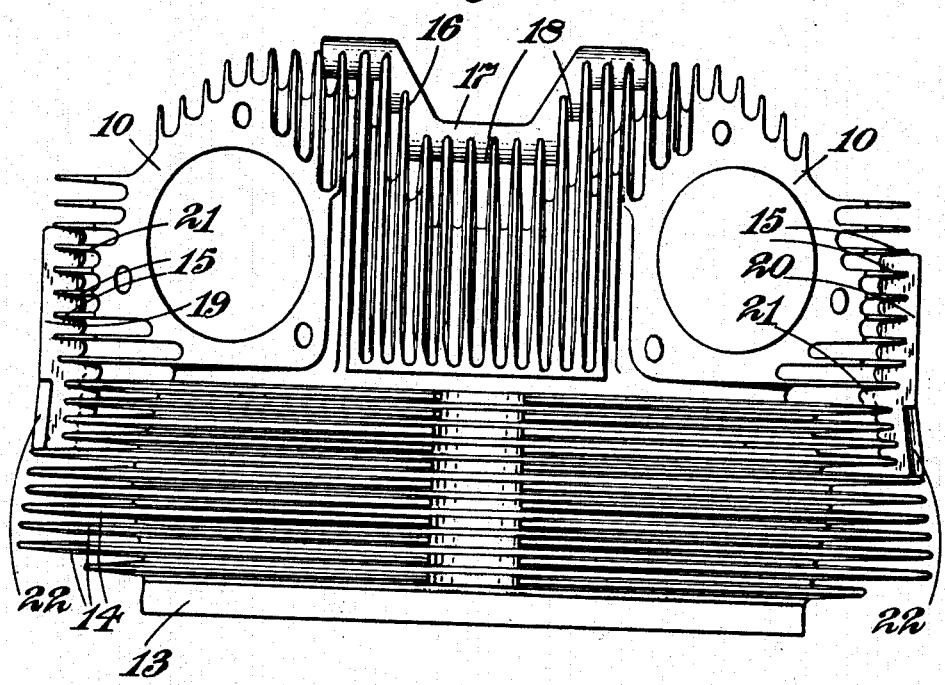
Figure 3:
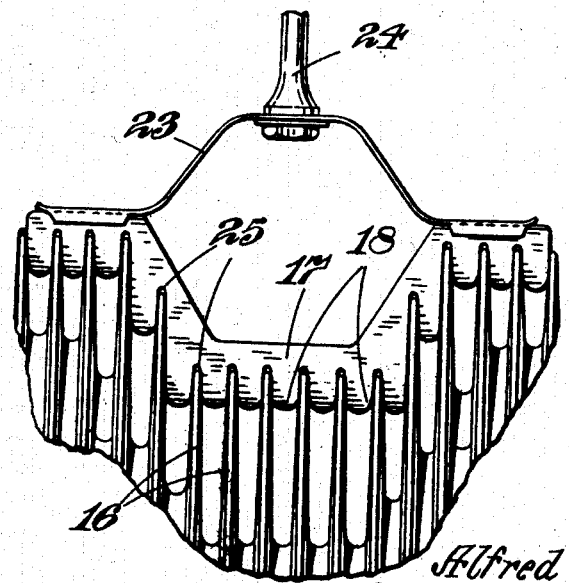

Specific embodiments of the invention will now be described, by way of example, as applied to the cylinder-head of an air-cooled aircraft engine. In the accompanying drawings:

Figure 1 is an elevation of a cylinder-head showing the invention applied to it, Figure 2 is a plan corresponding to Figure 1, and Figure 3 is an elevation, to an enlarged scale, of part of the cylinder-head showing an alternative arrangement for holding the damping pad in place.

As shown in Figures 1 and 2, the cylinder-head is formed with the usual facings 10 to which the exhaust pipes are connected, sockets 11, 12 for the exhaust and inlet poppet-valves respectively, and a spigot-portion 13 which engages the cylinder barrel. The cylinder-head is formed over substantially its entire surface with cooling fins. Near the spigot-portion 13 the fins 14 are circular; higher up the fins 15 have straight edges and on the crown of the cylinder-head the fins 16 run from front to back.

In order to damp out the vibration above referred to the fins 16 are engaged by a moulded pad 17 of resilient material, the pad being applied to the edges of a group of the fins where the vibration is most intense. The pad is integrally formed with projections 18 which, as shown in Figure 1, penetrate the spaces between the fins by a short distance and engage the adjacent faces of the fins. The width of the pad 17, as measured along the fin-edge, is preferably small, as shown in Figure 2, so that the flow of cooling air is not materially obstructed.

Similar pads 19 and 20 may engage the sides of the cylinder-head each being formed with integral projections 21 which penetrate the inter-fin spaces and engage the adjacent faces of the fins 14 and 15. The shape of the pads 19 and 20 may be understood by comparing Figures 1 and 2, the bottom of each pad being suitably curved as shown at 22 to conform to the shape of the circular fins 14. However, the shape of the damping pad will always be chosen according to the shape of the fins at the point at which it is to be applied.

The pads 17, 19 and 20 may be held in place by a suitable adhesive or cement. For example, the pads are preferably composed of a synthetic rubber-like compound which has a suitable degree of hardness and which is not destroyed by the heat of the engine or attacked by oil or petrol. One such compound which has been found to satisfy these requirements is that known as "Neoprene." A suitable adhesive or cement for fastening the pads in place is a solution of the same substance in a suitable solvent. Other materials, or mixtures of them, may be used, or the pads may be composed of a mixture of a rubber-like substance with suitable fillers so long as the resulting material has the required properties, specified above.

Where the pads are cemented to the cylinder-head in the manner above described, no special provision need be made to accommodate expanding or contracting movements of the cylinder-head with changes in temperature and the fins may penetrate to the roots of the spaces between adjacent projections 18 or 21. However, in an alternative form of the invention, the pads may be supported from another fixed part of the engine. For example, as shown in Figure 3, the pad 17 is carried by a metal plate 23 which is supported by a bolt 24 from the cowl surrounding the cylinders of a radial-cylinder aircraft engine. Alternatively, the bolt 24 may be carried by any other fixed part. In like manner the pads 19 and 20 may be supported by metal plates or brackets from the inter-cylinder baffles provided to guide the cooling air into the desired paths around the cylinders. The metal plate 23 need not be secured to the pad but may be of springy metal and press lightly on the pad to hold it in place. When the pads are supported by a structural part, other than the engine cylinder, as shown in Figure 3, it is necessary that the fins 16 of the cylinder should not penetrate to the roots of the recesses between the projections 18 but that a small clearance 25 should be left, as shown, to allow for the expansion of the cylinder with respect to the fixed supporting part.

The excessive vibration above referred to is particularly pronounced in the case of the cylinder-head fins of an air-cooled aircraft engine.

However, in some circumstances, the fins on the cylinder barrel may require damping in which case pads similar to the pads 19 and 20 could be applied to the cylinder barrel fins in a manner which will be obvious from the foregoing description.

We claim:

1. A finned body comprising a plurality of cooling fins and a pad of resilient material held in contact with said fins, so as to damp their vibration, said material being supported by means independent of said finned body.

2. A finned body comprising cooling fins, a vibration-damping pad held in contact with said fins by supporting means independent of the body of which the said fins form a part and integral projections from the pad shaped and arranged in relation to the fins that the tips of the fins penetrate the recesses between the said projections but do not penetrate to the roots of such recesses.

3. A finned body comprising cooling fins and a vibration damping pad of resilient material extending along a part of the length of at least one such fin and being cemented thereto.

4. A finned body comprising cooling fins separated by inter-fin spaces, a moulded pad of rubber-like material having spaced projections which penetrate the inter-fin spaces and engage the faces of adjacent fins along a part only of the length of the fins and thereby damp out vibrations in the fins.

5. A finned body comprising cooling fins, a vibration damping pad held in contact with said fins over a part only of the length of said fins, by supporting means independent of the body of which the said fins form a part and integral projections from the pad shaped and arranged in relation to the fins that the tips of the fins penetrate the recesses between the said projections but do not penetrate to the roots of such recesses.

6. A finned body comprising cooling fins and a vibration damping pad of resilient material extending along a part of the length of at least one such fin.

7. A finned body comprising a plurality of cooling fins and a pad of resilient material in contact with said fins so as to damp their vibration, said material being cemented to said finned body.

ALFRED HUBERT ROY FEDDEN,
FRANK NIXON.